(12) United States Patent
Abousefian et al.

(10) Patent No.: US 10,155,260 B2
(45) Date of Patent: Dec. 18, 2018

(54) METHOD FOR THE HIGH-TEMPERATURE SHAPING OF A METAL BLADE REINFORCEMENT

(71) Applicant: SAFRAN AIRCRAFT ENGINES, Paris (FR)

(72) Inventors: Jacques Abousefian, Acheres (FR); Antoine Bosselut, Souvigny-de-Touraine (FR); Gilles Charles Casimir Klein, Mery sur Oise (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 318 days.

(21) Appl. No.: 14/913,050

(22) PCT Filed: Aug. 25, 2014

(86) PCT No.: PCT/FR2014/052117
§ 371 (c)(1),
(2) Date: Feb. 19, 2016

(87) PCT Pub. No.: WO2015/028750
PCT Pub. Date: Mar. 5, 2015

(65) Prior Publication Data
US 2016/0199902 A1   Jul. 14, 2016

(30) Foreign Application Priority Data
Sep. 2, 2013 (FR) .................................. 13 58360

(51) Int. Cl.
*B21D 22/06* (2006.01)
*B21K 3/04* (2006.01)
(Continued)

(52) U.S. Cl.
CPC ................ *B21K 3/04* (2013.01); *B21D 22/06* (2013.01); *B21D 53/78* (2013.01); *B21J 13/02* (2013.01);
(Continued)

(58) Field of Classification Search
CPC ........ B21D 22/06; B21D 22/24; B21D 22/26; B21D 53/78; B21J 13/025; B23P 15/04; B21K 3/04; F05D 2230/25; F05D 2230/54
See application file for complete search history.

(56) References Cited

U.S. PATENT DOCUMENTS

| 65,987 A | * | 6/1867 | Allison | ................... B21D 5/04 72/323 |
| 2,231,772 A | * | 2/1941 | Nelson | ................... B21K 3/04 29/889.6 |

(Continued)

FOREIGN PATENT DOCUMENTS

| FR | 2 961 866 A1 | 12/2011 |
| FR | 2 965 496 A1 | 4/2012 |
| WO | 94/23890 A1 | 10/1994 |

OTHER PUBLICATIONS

International Search Report dated Jan. 21, 2015 in PCT/FR14/052117 Filed Aug. 25, 2014.

*Primary Examiner* — Edward Tolan
(74) *Attorney, Agent, or Firm* — Oblon, McClelland, Maier & Neustadt, L.L.P.

(57) ABSTRACT

A shaping method making use of shaper tooling suitable for high-temperature shaping of a preformed metal part having two side fins extending from a nose, the method including putting the preformed metal part into place in a first bottom die of the tooling, holding the preformed metal part in a first determined position with a first movable central insert, forming one of the side fins of the preformed metal part into
(Continued)

its final shape in alignment with the nose by moving with a first movable top die, turning over the preformed metal part, putting the preformed metal part into place in a second bottom die of the tooling, holding the preformed metal part in a second determined position with a second movable central insert, and shaping the other side fin into its final shape in alignment with the nose by moving with a second movable top die.

14 Claims, 2 Drawing Sheets

(51) Int. Cl.
| | |
|---|---|
| *B21J 13/02* | (2006.01) |
| *B21D 53/78* | (2006.01) |
| *F01D 5/28* | (2006.01) |
| *F04D 29/32* | (2006.01) |
| *B23P 15/04* | (2006.01) |

(52) U.S. Cl.
CPC ............ *B21J 13/025* (2013.01); *F01D 5/288* (2013.01); *F04D 29/324* (2013.01); *B23P 15/04* (2013.01); *F05D 2230/25* (2013.01); *F05D 2230/54* (2013.01); *F05D 2240/121* (2013.01); *F05D 2240/122* (2013.01); *F05D 2240/303* (2013.01); *F05D 2240/304* (2013.01); *Y02T 50/672* (2013.01)

(56) References Cited

U.S. PATENT DOCUMENTS

| | | | | |
|---|---|---|---|---|
| 2,422,810 | A | * | 6/1947 | Tiedemann ............ B21D 53/78 29/889.6 |
| 3,045,967 | A | * | 7/1962 | Clarke .................. B21D 53/78 29/889.72 |
| 5,694,683 | A | | 12/1997 | Teets et al. |
| 2009/0165299 | A1 | * | 7/2009 | Cammer ................ B21D 53/78 29/889.7 |
| 2011/0010937 | A1 | | 1/2011 | Cammer |
| 2013/0089428 | A1 | | 4/2013 | Hottier et al. |
| 2013/0180304 | A1 | | 7/2013 | Leveque et al. |

\* cited by examiner

METHOD FOR THE HIGH-TEMPERATURE SHAPING OF A METAL BLADE REINFORCEMENT

BACKGROUND OF THE INVENTION

The technical field of the invention is that of turbine engines, and in particular that of turbine engine fan blades made of composite material and having a leading edge including metal structural reinforcement, and the present invention thus relates more particularly to a method of high-temperature shaping metal parts, e.g. such as metal structural reinforcement for the leading edge of a turbine engine blade made of composite material.

Nevertheless, the invention is equally applicable to making any part of complex geometrical shape and to making metal reinforcement for reinforcing the leading edge or the trailing edge of a blade for any type of terrestrial or aviation turbine engine, and in particular for a helicopter turboshaft engine or for an airplane turbojet.

It is known to provide turbine engine fan blades that are made of composite material with metal structural reinforcement that extends over the full height of the blade and beyond its leading edge, as described in Document EP 1 908 919 filed in the name of the Applicant. Such reinforcement enables the composite blades to be protected in the event of a foreign body impacting the fan, e.g. a bird, hail, or indeed grit.

In particular, the metal structural reinforcement protects the leading edge of the composite blade by avoiding any risk of delamination, of fiber rupture, or indeed damage by loss of cohesion between fibers and the matrix. In known manner, it is made either entirely by milling a block of titanium, which requires numerous reworking operations and complex tooling, implying high fabrication costs, or else from a preform that is obtained from a simple metal bar by a succession of forging steps, as described in particular in French patent application FR 2 961 866 filed in the name of the Applicant.

Nevertheless, the last forging steps are particularly difficult to perform, given the presence of undercuts in the reinforcement. That is why the Applicant has developed "multi-effect" tooling for hot shaping as described in its patent application FR 2 965 496, that enables deformation to be performed three-dimensionally (i.e. simultaneously in different directions) by means of an inexpensive single-effect press (i.e. operating on only one working axis) under high-temperature conditions, i.e. above 850° C. (and around 940° C. for making reinforcement out of titanium).

Although that method is generally satisfactory in terms of its speed and simplicity, it nevertheless still presents certain drawbacks as a result of the way movements need to be linked for closing the tooling. As a result, the part that is to be made can be poorly positioned in the tooling, and it is also not easy to remove it from the recess during unmolding, which can lead to the part being deformed.

OBJECT AND SUMMARY OF THE INVENTION

A main object of the present invention is thus to mitigate such drawbacks by proposing a method of shaping a preformed metal part having two side fins extending from a nose, the method making use of shaper tooling and comprising:

a step of putting the preformed metal part into place in a first bottom die of said tooling;

a step of holding said preformed metal part in a first determined position by means of a first movable central insert;

a step of forming one of said side fins of said preformed metal part into its final shape in alignment with said nose by moving a first movable top die along a first axis;

a step of turning over said preformed metal part having one of said side fins that is thus shaped in its final shape;

a step of putting said preformed metal part into place in a second bottom die of said tooling;

a step of holding said preformed metal part in a second determined position by means of a second movable central insert; and a step of shaping the other one of said side fins of said preformed metal part into its final shape in alignment with said nose by moving a second movable top die along a second axis.

Thus, blocking the part in determined positions prior to shaping its two side fins into their final shapes avoids the movement that is observed with the prior art tooling.

Preferably, said step of holding in a first determined position is performed by moving the first movable central insert along a first axis.

Advantageously, said step of holding in a second determined position is performed by moving the second movable central insert along a second axis. Said axis along which said second movable central insert is moved corresponds substantially to the midplane between said side fins.

Preferably, said second movable central insert is covered in a protective layer of boron nitride in order to facilitate withdrawal when extracting said preformed metal part from said shaper tooling.

The invention also provides shaper tooling suitable for high-temperature shaping of a preformed metal part obtained by the above-specified shaping method.

BRIEF DESCRIPTION OF THE DRAWINGS

Other characteristics and advantages of the present invention appear from the following description made with reference to the accompanying drawings, which show an embodiment having no limiting character, and in which.

DETAILED DESCRIPTION OF AN IMPLEMENTATION

Figure 1:
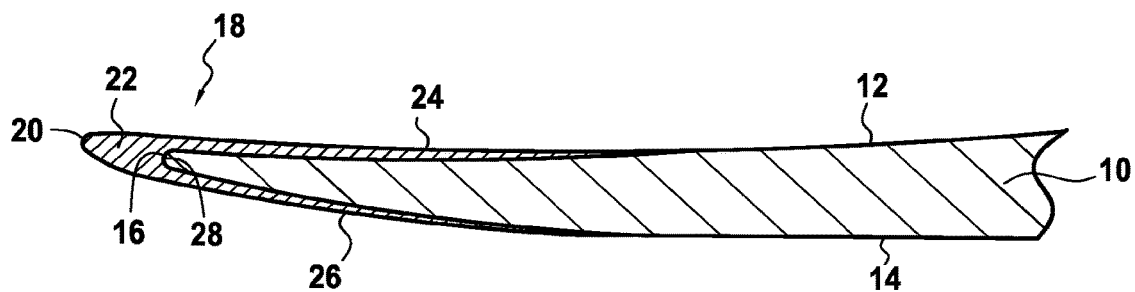
FIG. 1 is a section view of the leading edge of a fan blade made of composite material and showing its metal structural reinforcement.

FIG. 1 is a fragmentary view of a composite blade including metal structural reinforcement for its leading edge obtained by means of the shaping method of the invention.

By way of example, the blade 10 shown is a fan blade of a turbine engine (not shown) extending between a leading edge and a trailing edge from a blade root to a blade tip and typically obtained by draping (filling, adhesively bonding) woven composite material. By way of example, the composite material used may be composed by an assembly of woven carbon fibers and a resin matrix, the assembly being shaped by molding using a conventional resin vacuum injection method of the resin transfer molding (RTM) type.

A pressure side surface 12 and a suction side surface 14 form the side faces of the blade 10 interconnecting the leading edge 16 and the trailing edge (not shown) of the blade 10. In known manner, the blade 10 includes metal structural reinforcement 18, preferably based on titanium (because of its great capacity to absorb the energy due to impact), which reinforcement is adhesively bonded to the leading edge 16 to which it fits closely and which it extends so as to form a reinforcement leading edge 20. The metal structural reinforcement is adhesively bonded on the blade 10 by using an adhesive known to the person skilled in the art, such as for example a cyano-acrylic adhesive or indeed an epoxy adhesive.

In conventional manner, the metal structural reinforcement 18 is a single piece having a substantially V-shaped section presenting a base 22 forming the leading edge 20 and extended by two lateral flanks 24 and 26 that are fitted closely respectively over the pressure side 12 and the suction side 14 of the blade 10. The flanks 24 and 26 present a tapered or thinning profile going towards the trailing edge of the blade. The base 22 has a rounded internal profile 28 suitable for fitting closely to the rounded shape of the leading edge 16 of the blade 10.

Figure 2:
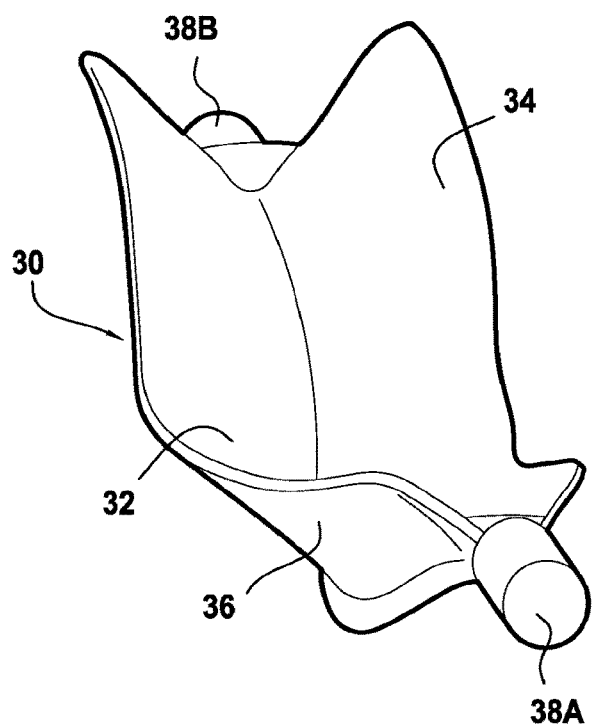
FIG. 2 is a perspective view of the preformed metal part used for making the metal structural reinforcement of FIG. 1 prior to performing the shaping method of the invention.

The shaping method of the invention makes it possible to finalize preparation of metal structural reinforcement as shown in FIG. 1 (where the reinforcement is shown in its final state mounted on a turbine engine fan blade 10), starting from a preformed metal part 30 as shown in the perspective view of FIG. 2.

As is known from the initial steps of the method of above-mentioned application FR 2 961 866, the preformed metal part 30 is obtained from a metal bar of circular section, of diameter and of length that are functions of the desired blade. The bar is initially deformed in two directions in order to form a double camber by using an isothermal press at a temperature lying in the range 700° C. to 940° C. (when the bar is made of titanium). Thereafter the bar as twisted in this way is subjected to die pressing by means of a hydraulic or screw press at a temperature of about 940° C., prior to being shaped by indirect extrusion by means of a punch (or a plurality of punches, depending in particular on the quantity of material to be extruded), the die(s) having a V-shape that corresponds to the internal final shape of the internal profile 28 of the base 22 of the metal reinforcement 18, i.e. the rounded shape that is complementary to the shape of the leading edge 16 of the blade 10.

At the end of these steps prior to the shaping method of the invention, the preformed metal part 30 is a fabrication intermediate of substantially V-shape (or more exactly Y-shape) having two side fins 32, 34 forming between them an angle lying in the range 60° to 90° and extending from a solid nose 36 corresponding substantially to the final shape of the base 22 of the metal structural reinforcement 18. The thicknesses of the side fins present profiles that taper on going away from the nose so as to match the pressure side and suction side faces of the blade.

At the ends of this part 30, studs 38A, 38B coming from the initial metal bar facilitate handling of the part.

FIGS. 3 to 6 show the various steps of shaping the metal structural reinforcement 18 from the preformed metal part 30 obtained by the above-described steps, the shaping being performed using shaper tooling suitable for shaping (forming or forging) the part at high temperature. The purpose of this tooling is to move the side fins 32 and 34 towards each other so as to reduce the angle they form between them in order to obtain the desired final shape. In a closed enclosure (not shown) and at a temperature of about 920° C. (plus or minus 20° C.), the method makes use in succession of first and second sets 40 and 50 each comprising a bottom die 42, 52, a movable central insert 44, 54, and a movable top die 46, 56.

Figure 3:
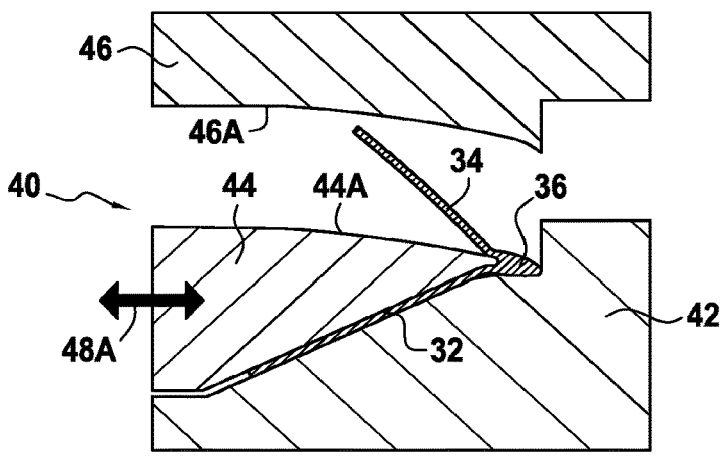
FIGS. 3 to 6 show the corresponding positions of the shaper tooling used for performing the shaping method of the invention.

As shown in FIG. 3, the preformed metal part 30 is initially put into place in the bottom die 42 where it fits closely to its internal outline, and then the movable central insert 44 is moved along the axis 48A (horizontal in the drawing) until it comes into contact with the internal portion of the nose 36 so that, in this first position, the preformed metal part 30 is held in place by blocking its first side fin 32 against the movable central insert and the bottom die.

Figure 4:
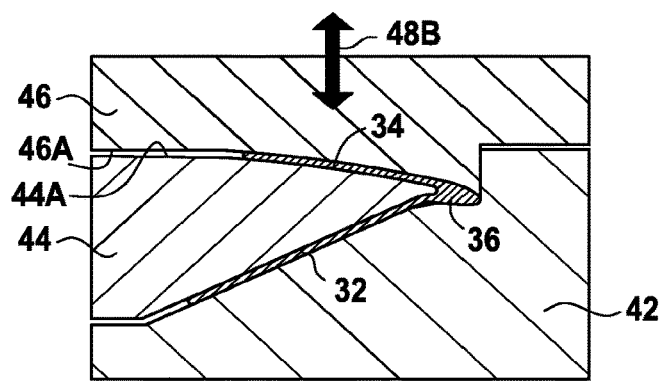

FIG. 4 shows the following step of the method of the invention in which the top die 46 is moved along the axis 48B (vertical in the drawing) so that, by closing the first set 40, it shapes the second side fin 34 against the movable central insert 44. To do this, the top wall 44A of the movable central insert and the bottom wall 46A of the movable top die present facing faces that are shaped to leave between them only the space needed for shaping the second side fin 34 of the preformed metal part into its final shape, i.e. in alignment with the nose 36.

Figure 5:
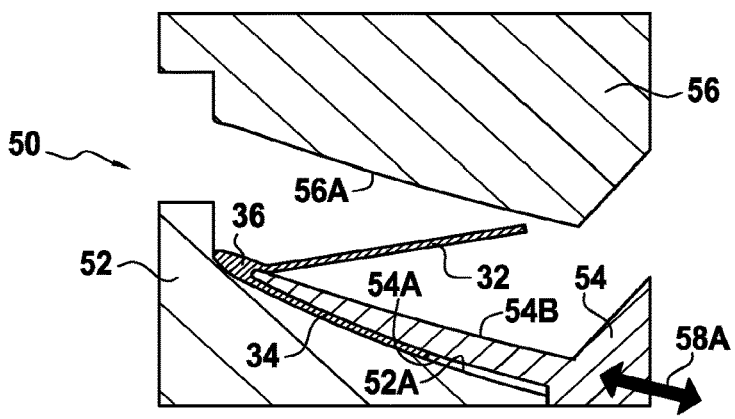

In order to shape the first side fin 32, it is necessary to turn over the preformed metal part obtained in the intermediate step of shaping the second side fin 34 and to put it into place in the second bottom side 52 of the shaper tooling against which it matches the internal outline, as shown in FIG. 5. The movable central insert 54 is then moved along the axis 58A (substantially in the midplane between the side fins and thus sloping upwards in the drawing) until it comes into contact with the internal portion of the nose 36 so that, in this second position, the preformed metal part 30 is held in place by blocking its previously shaped second side fin 34 between the movable central insert and the bottom die 52. For this purpose, the facing faces 54A of the movable central insert and of the bottom die 52A are naturally shaped so as to leave between them only the space necessary for receiving the second side fin.

Figure 6:
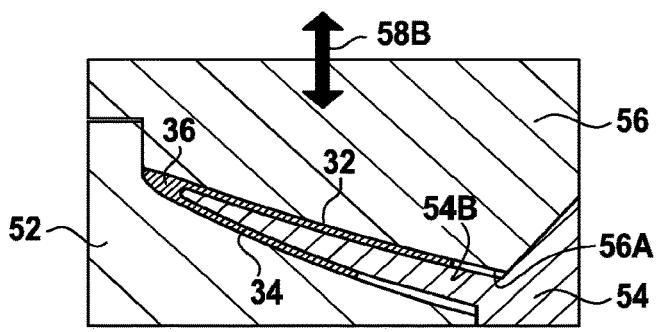

FIG. 6 shows the last step of the method of the invention in which the top die 56 is moved along the axis 58B (vertical in the drawing) so that by closing the second set 50 it comes to shape the first side fin 32 against the movable central insert 54. To do this, the top wall 54B of the movable central insert and the bottom wall 56A of the movable top die present facing faces that are shaped to leave between them only the space necessary for shaping the first side fin 32 of the preformed metal part into its final shape, i.e. likewise in alignment with the nose 36. The tooling is kept closed against the part for several minutes in order to avoid any risk of the part moving back elastically.

At the end of these shaping steps, the preformed metal part 30 presents the final Y-shape of the metal structural reinforcement 18 with its two side flanks 24, 26 extending from its base 22 and presenting between them the final angle that is required by technical specifications. All that then remains to be done is to extract the metal structural reinforcement (preferably while hot) by moving in succession the movable top die and the movable central insert 54 along their respective axes 58B and 58A (in opposite directions to their preceding movements) in order to withdraw the preshaped metal part from the second set 50, and then to cut off the studs at the two ends of this part in order to obtain the metal structural reinforcement ready for use. When the movable central insert 54 comprises a plurality of portions, it is withdrawn before moving the top die. This extraction is advantageously made easier by depositing a protective layer of boron nitride on the movable central insert and by making the movable central insert as a plurality of portions suitable for being withdrawn individually. Where necessary, and depending on its utilization, this extraction may be followed by polishing the metal structural reinforcement.

It should be observed that although the method of the invention is described mainly for metal structural reinforcement based on titanium, it is naturally equally applicable to materials based on nickel or indeed based on steel, by using temperatures that are appropriate for those alloys.

It should also be observed that although the invention is described more particularly with reference to shaping metal reinforcement for a turbine engine blade made of composite material, it is clear that it also applies to metal reinforcement for a turbine engine blade made of metal. Likewise, although the invention is more particularly described with reference to metal reinforcement for a leading edge of a turbine engine blade, it is also applicable to making metal reinforcement for a trailing edge of a turbine engine blade.

The invention claimed is:

1. A shaping method making use of shaper tooling suitable for high-temperature shaping of a preformed metal part having first and second side fins extending from a nose, the method comprising:
   putting said preformed metal part into place in a first bottom die of said tooling;
   holding said preformed metal part in a first determined position with a first movable central insert;
   forming the first side fin of said preformed metal part into a final shape of the first side fin in alignment with said nose, said forming being preformed with a first movable top die;
   turning over said preformed metal part having the first side fin that is shaped in the final shape of the first side fin;
   putting said preformed metal part into place in a second bottom die of said tooling;
   holding said preformed metal part in a second determined position with a second movable central insert; and
   shaping the second side fin of said preformed metal part into a final shape of the second side fin in alignment with said nose, said shaping being performed with a second movable top die.

2. The shaping method according to claim 1, wherein said holding in the first determined position is performed by moving said first movable central insert along a first axis.

3. The shaping method according to claim 1, wherein said shaping the first side fin of said preformed metal part is performed by moving said performed metal part along a second axis.

4. The shaping method according to claim 3, wherein said holding in the second determined position is performed by moving said second movable central insert along a third axis.

5. The shaping method according to claim 4, wherein said axis in which said second movable central insert is moved corresponds substantially to a midplane between said first and second side fins.

6. The shaping method according to claim 4, wherein said step of shaping the side fin of said preformed metal part is performed by moving said performed metal part along a fourth axis.

7. The shaping method according to claim 6, wherein said second and fourth axes along which said first and second movable top dies are moved respectively are identical.

8. The shaping method according to claim 1, wherein said second movable central insert is covered in a protective layer of boron nitride in order to facilitate withdrawal when extracting said preformed metal part from said shaper tooling.

9. A shaper tooling suitable for high-temperature shaping of a preformed metal part having first and second side fins extending from a nose, the tooling comprising:
   a first bottom die in which said preformed metal part is put into place;
   a first movable central insert for holding said preformed metal part in a first determined position;
   a first movable top die for shaping the first side fin of said preformed metal part into a final shape of the first side fin in alignment with said nose;
   a second bottom die in which said preformed metal part is put into place after being turned over;
   a second movable central insert for holding said preformed metal part in a second determined position; and
   a second movable top die for shaping the second side fin of said preformed metal part into a final shape of the second side fin in alignment with said nose.

10. The shaper tooling according to claim 9, wherein said second movable central insert is covered in a protective layer of boron nitride.

11. The shaping method according to claim 1, wherein the first movable central insert includes a first surface corresponding to the final shape of the first side fin, and a second surface corresponding to a non-final shape of the second side fin.

12. The shaping method according to claim 11, wherein the second movable central insert includes a first surface corresponding to the final shape of the first side fin, and a second surface corresponding to the final shape of the second side fin.

13. The shaper tooling according to claim 9, wherein the first movable central insert includes a first surface corresponding to the final shape of the first side fin, and a second surface corresponding to a non-final shape of the second side fin.

14. The shaper tooling according to claim 13, wherein the second movable central insert includes a first surface corresponding to the final shape of the first side fin, and a second surface corresponding to the final shape of the second side fin.

* * * * *